United States Patent [19]

Devine, Jr.

[11] 4,119,261
[45] Oct. 10, 1978

[54] INERTIA WELDING PROCESS FOR MAKING AN ANODE ASSEMBLY

[75] Inventor: Thomas M. Devine, Jr., Schenectady, N.Y.

[73] Assignee: General Electric Company, Schenectady, N.Y.

[21] Appl. No.: 859,610

[22] Filed: Dec. 12, 1977

Related U.S. Application Data

[62] Division of Ser. No. 788,247, Apr. 18, 1977.

[51] Int. Cl.² .............................................. B23K 27/00
[52] U.S. Cl. ..................................... 228/113; 228/263
[58] Field of Search ........................ 228/112, 113, 263

[56] References Cited

U.S. PATENT DOCUMENTS

| | | | |
|---|---|---|---|
| 3,346,947 | 10/1967 | Hollander | 228/113 |
| 3,478,411 | 11/1969 | Goloff | 228/113 |
| 3,497,942 | 3/1970 | Weiss | 228/113 |
| 3,613,218 | 10/1971 | Kiwalle | 228/113 |

*Primary Examiner*—Donald G. Kelly
*Attorney, Agent, or Firm*—Donald M. Winegar; Joseph T. Cohen; Charles T. Watts

[57] ABSTRACT

An inertia welding process is employed to join the stem to the substrate of a disc thereby forming an anode assembly for a rotating x-ray anode tube.

4 Claims, 3 Drawing Figures

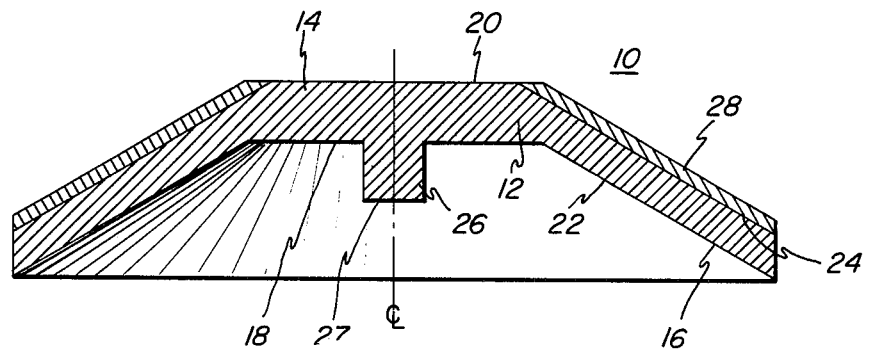
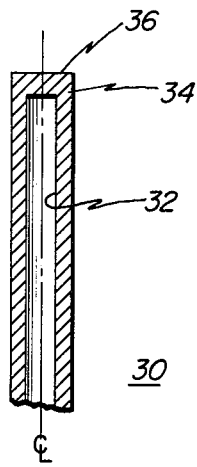
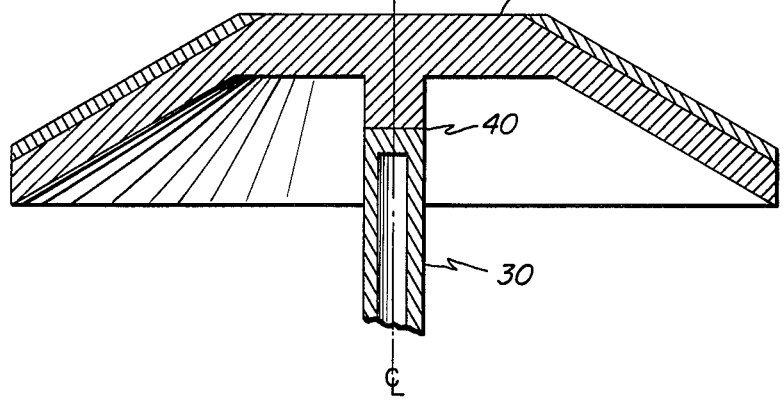

1

INERTIA WELDING PROCESS FOR MAKING AN ANODE ASSEMBLY

This is a division of application Ser. No. 788,247, filed Apr. 18, 1977.

BACKGROUND OF THE INVENTION

1. Field of the Invention

This invention relates to rotating x-ray anode tubes and in particular to the joining of the anode disc to the anode stem.

2. Description of the Prior Art

The anode assembly of a rotating x-ray anode tube consists of an anode disc comprising a tungsten-rhenium alloy target joined to a base, or substrate, comprising either a molybdenum or molybdenum-tungsten alloy. The anode disc is joined to a stem which, in turn, is attached to the rotor of an induction motor. The stem may be of columbium.

A method for joining the substrate to the stem includes cold forming followed by a heat treatment to produce a diffusion bond between the components. However, to achieve a good diffusion bond one must practice good process steps of adhering to precise measurements and adherence to good cleanliness habits. The dimensions of the outside diameter of the stem and the inside diameter of the hole in the substrate must be maintained very closely. Ideally an interference fit is provided to produce a good diffusion bond. Such a fit is dependent upon degree of surface finish, and surface cleanliness. Should the initial extent of intimate contact between the stem and the substrate of the disc be less than desired, a poor, or incomplete, diffusion bond may result. An incomplete bond between the stem and the disc constitutes a structural flaw. Such a flaw, under the influence of rotational stresses and, more importantly, cyclic thermal stresses can nucleate a catastrophic failure of the anode disc.

It is therefore an object of this invention to provide a new and improved method for joining the stem to the substrate of the disc of an anode assembly.

Another object of this invention is to provide a two step inertia welding process to make anode assemblies for rotating x-ray anode tubes.

Other objects of this invention will, in part, be obvious and will, in part, appear hereinafter.

SUMMARY OF THE INVENTION

In accordance with the teachings of this invention there is provided a new and improved method for joining the stem to the substrate of the disc in an anode assembly for a rotating x-ray anode tube. The stem and the substrate are positioned in inertia welding apparatus in a manner whereby the surfaces to be welded together are in an abutting relationship with each other. The substrate is preheated to an elevated temperature by the application of a first predetermined flywheel moment of inertia, a first predetermined axial force and a first predetermined spindle speed to the respective positioned components. In essence the substrate is preheated by frictional energy. Thereafter, the components (stem and substrate) are joined together by a weld joint formed by inertia welding. The inertia welding is accomplished by the application of a second predetermined flywheel moment of inertia, a second predetermined axial force and a second predetermined spindle speed. The first and second flywheel moments of inertia are the same, the first axial force is less than the second axial force and the first spindle speed is greater than the second spindle speed.

DESCRIPTION OF THE DRAWINGS

FIG. 1 is a side elevation view, in cross-section, of a disc of an anode assembly.

FIG. 2 is a side elevation view, in cross-section, of a stem of an anode assembly.

FIG. 3 is a side elevation view, in cross-section, of an anode assembly.

DESCRIPTION OF THE INVENTION

With reference to FIG. 1, there is shown a disc 10 suitable for use in rotating x-ray anode tubes. The disc 10 comprises a base or substrate 12 which has a saucer-like configuration of a central portion 14 and an integral outer portion 16. The central portion 14 has inner and outer surfaces 18 and 20, respectively. The integral outer portion 16 has inner and outer surfaces 22 and 24, respectively. Centrally disposed on the inner surface 18 is a raised boss 26 which is integral with the central portion 14. The raised boss has a central axis which is coincident with the central axis of the disc 10. Additionally the raised boss has a cross-sectional surface area 27. The material of the substrate or base 12 may be of molybdenum, a molybdenum based alloy such as Mo-5w or other suitable material capable of withstanding from 1000° C. to 1350° C. operating temperatures, rapid heating cycles from room temperature to operating temperature and returning to room temperature, and a minimum of 10,000 cycle operation. The molybdenum substrate may comprise material which is forged and recrystallized or may be made from pressed, sintered and forged stock.

Disposed on, and joined to, the outer surface 24 of the outer portion 16 of the disc 10 is a layer 28 of a metal suitable to act as an x-ray target. The metal may be of tungsten or a tungsten alloy. A suitable tungsten alloy is tungsten alloyed with from 3% to 10%, by weight, rhenium.

Referring now to FIG. 2, there is shown a stem 30 made of a suitable metal such, for example, as columbium. Other suitable materials are columbium alloys such, for example, as Cb291, Cb103 and Cb-1Zr. The stem 30 may have an interior wall surface 32 which defines an interior chamber which reduces the thermal conductivity of the stem. The chamber has a longitudinal axis coincidal with the longitudinal axis of the stem 30. The stem 30 has an integral solid end portion 34. The end portion 34 has a surface 36.

With reference to FIG. 3, the stem 30 is joined to the disc 10 by an inertia welding process. The inertia welding process joins the two components together at their respective surfaces 36 and 27. The conventional inertia welding process embodies application of pressure in one step. Therefore, since molybdenum and its alloy material, which comprises the material of the disc 10, has a relatively high ductile-to-brittle transition temperature, it is necessary to preheat the disc 10 to a temperature of from about 200° C. to about 400° C. prior to the application of pressure to accomplish the weld. The range of axial pressure required for successful inertial welding of the components is from about 35,000 psi to about 50,000 psi. The flywheel moment of inertia for the stem 30 is from 9 lb-ft² to 19 lb-ft². The range of rotation for the stem 30 is from 1400 rpm to 2800 rpm. The total upset is approximately 0.4 inch and the metal lost, or total shorting of the stem 30 is 0.2 ± 0.1 inch.

Employing the above inertia welding parameters, an excellent weld joint 40 is achieved. Examination of the weld region reveals the material in the region of the weld joint 40 to be fine grain structure. The weld joint is substantially free of voids and internal stresses which are prevalent in prior art assemblies made by other manufacturing process techniques.

A two step inertia welding process may also be practiced. By employing the two step process one eliminates the need to preheat the disc 10 separately. In the first step, a high spindle speed is employed for rotating the stem 30 and a low axial force is employed to heat the disc 10 by friction. In the second step, a lower spindle speed is employed in conjunction with a higher axial force to join the stem 30 to the disc 10 by inertia welding. The weld joint 40 which results again exhibits excellent physical characteristics. The total mount of upset is about 0.4 inches. The metal lost, from the stem 30 is 0.2 ± 0.1 inch.

The following Table summarizes the conditions for the two step inertia welding process:

Table

| Parameter | Minimum | Maximum | Preferred |
|---|---|---|---|
| Flywheel Moment of Inertia (lb-ft$^2$) | 9.0 | 19.0 | 9.0 |
| First Axial Force (lbs.) | 3,100 | 4,500 | 3,500 |
| First Spindle Speed (RPM) | 4,000 | 4,800 | 4,500 |
| Second Axial Force (lbs.) | 11,000 | 13,250 | 12,500 |
| Second Spindle Speed (RPM) | 250 | 500 | 400 |
| Upset (inches) | 0.2 | 0.6 | 0.4 |

The above values for the parameters have resulted in excellent weld joints when the surfaces 27 and 36 are of the order of 0.4418 inch$^2$ ($\frac{3}{4}$ inch diameter). The weld energy during the friction heating cycle for the disc 10 is of the order of 65,000 lb-ft per square inch.

The effectiveness of the novel welding process of this invention was demonstrated by experiments in which weld samples were purposefully pulled to failure. In all instances, failure occurred entirely within either the molybdenum portion or the columbium alloy portion of the sample well away from the weld interface.

I claim as my invention:

1. A method for affixing a stem to a disc which includes an x-ray target affixed to a selected surface area of a substrate to make an anode assembly for a rotating x-ray anode tube comprising
    (a) preheating the disc, wherein the substrate comprises a material which is one selected from the group consisting of molybdenum and molybdenum-based alloys to a predetermined range of elevated temperature of from about 200° C. to about 400° C.;
    (b) placing the preheated disc and a stem, which comprises a material which is one selected from the group consisting of columbium, columbium 291, columbium 103, and columbium-1Zr, to be joined together in inertia welding apparatus whereby the respective surface areas thereof to be inertia welded together are in an abutting relationship with each other;
    (c) subjecting the positioned disc and stem to a predetermined flywheel moment of inertia of from about 9#-ft$^2$ to about 19#-ft$^2$, an axial pressure of from about 35,000 psi to about 50,000 psi and a predetermined spindle speed of from about 1400 RPM to 2800 RPM, and
    (d) joining the stem to the disc by a weld joint formed at the interface of the abutting surface areas as a result of subjecting the disc and stem to the axial pressure.

2. The method of claim 1 and further including forming the substrate of the disc by pressing and sintering.

3. The method of claim 2 and further including forging the pressed and sintered substrate to a predetermined shape.

4. The method of claim 1 and further including forming the substrate of the disc by forging, and recrystallizing the material of the forged substrate.

* * * * *